United States Patent [19]

Strangfeld

[11] Patent Number: 4,577,829

[45] Date of Patent: Mar. 25, 1986

[54] SELF CLOSING VALVE

[75] Inventor: Reiner Strangfeld, Bückeburg, Fed. Rep. of Germany

[73] Assignee: Georg Rost und Soehne Armaturenfabrik GmbH und Co. KG., Porta Westfalica, Fed. Rep. of Germany

[21] Appl. No.: 642,300

[22] Filed: Aug. 20, 1984

[30] Foreign Application Priority Data

Aug. 20, 1983 [DE] Fed. Rep. of Germany ....... 3330135

[51] Int. Cl.[4] ............................................. F16K 21/04

[52] U.S. Cl. ....................................... 251/15; 251/22; 251/48

[58] Field of Search ....................... 251/36, 15, 17, 18, 251/19–23, 48

[56] References Cited

U.S. PATENT DOCUMENTS 1,273,140 7/1918 Brooks ................................. 251/36
1,385,456 7/1921 Kellan .................................. 251/36
2,204,191 6/1940 Sloan et al. .......................... 251/15

FOREIGN PATENT DOCUMENTS 3005280 8/1981 Fed. Rep. of Germany ........ 251/15

*Primary Examiner*—Samuel Scott
*Assistant Examiner*—Noah Kamen
*Attorney, Agent, or Firm*—Sprung Horn Kramer & Woods

[57] ABSTRACT

A self closing valve has a housing with a water inlet and outlet and with a valve piston positioned inside it in such a way that the end of the piston facing away from the valve seat demarcates a discharge chamber in conjunction with the inlet and outlet through flowthrough passages that are activated in opposite directions by supplementary-valve controls in such a way that the duration of operation is determined by a decelerated opening stroke of the valve piston and closure is activated by a rapid closing stroke of the valve piston. The initiating position of the supplementary-valve controls that is provided during the opening activation of the valve piston is designed to maintain itself hydraulically as the result of a pressure difference generated at a choking device as the result of the flow through the valve and discontinuing the automatic maintenance shifts the supplementary-valve controls. Any leakage flows that may occur at the self-maintaining members are diverted to the outlet, without being choked off, through the supplementary valve that is opened by means of the initiating position of the supplementary-valve controls and the supplementary valve closes once self-maintenance and the shift in the supplementary-valve controls that is provided thereby have been discontinued, eliminating any potential bypass flow parallel to the flow through the choking device on the part of the flow through the valve.

2 Claims, 4 Drawing Figures

1 7 23 11 20 8 10 4 6 12 21 81 13 82 50 41 5 19' 9 ϕD 18 87 5a 2 ϕd 14 15 3 16 17b

SELF CLOSING VALVE

BACKGROUND OF THE INVENTION

The present invention relates to a self closing valve that maintains a state hydraulically by means of a housing with a water inlet and outlet and with a valve piston positioned inside it in such a way that the end of the piston facing away from the valve seat demarcates a discharge chamber in conjunction with the housing, the discharge chamber communicates with the inlet and outlet through flowthrough passages that are activated in opposite directions by supplementary-valve controls in such a way that the duration of operation is determined by a decelerated opening stroke of the valve piston and closure is activated by a rapid closing stroke of the valve piston, whereby the initiating position of the supplementary-valve controls that is provided during the opening activation of the valve piston maintains itself hydraulically as the result of a pressure difference generated at a choking device as the result of the flow through the valve and whereby discontinuing the automatic maintenance shifts the supplementary-valve controls.

Self closing valves of this type are known, for instance, from German Offenlegungsschriften Nos. 2 852 006 and 2 946 558. The duration of operation is determined by an appropriately decelerated opening stroke of the valve piston. A control tappet, that is part of the supplementary-valve controls, etc. and is positioned axially inside the valve piston, maintains itself hydraulically in an (upper) initiating position. This is effected by a sealing plate, which is one of the self-maintaining members and which is associated with the control tappet, and operates in conjunction with the bottom surface of the valve piston, in connection with a choking collar, which is also associated with the control tappet, which is designed as a device to choke off the flow through the valve, and which generates a self-maintaining pressure difference.

The self-maintaining pressure difference can admittedly only be ensured if not only the water leaving the discharge chamber but also any leakage flows that may occur at the self-maintaining members are conducted to the outlet without being choked off. If this is not the case, the pressure difference at the self-maintaining members will decrease and self-maintenance will be unintendedly discontinued.

A potential solution in terms of the state of the art would be to enlarge the perforation that is open in the outlet direction in the control tappet. This would of course eliminate any problems in the self-maintenance phase. That the cross-section would represent a bypass for the flow through the valve once self-maintenance had been discontinued and that the bypass would decrease the tensional effect of the choking sleeve that is necessary for closure would, however, be a drawback. When flowthrough is low, with a highly calcified filter screen downstream for example, the closing stroke of the valve piston would be unreliable even with a small bypass cross-section (German OS Nos. 2 852 006 and 2 946 558), and necessarily even more unreliable the larger the cross-section.

SUMMARY OF THE INVENTION

The object of the present invention is to provide an self closing valve of the same generic type that will not only maintain its state reliably but will also close reliably.

This object is attained in accordance with the invention in that any leakage flows that may occur at the self-maintaining members are diverted to the outlet, without being choked off, through a supplementary valve that is opened by means of the initiating position of the supplementary-valve controls and in that the supplementary valve closes once self-maintenance and the shift in the supplementary-valve controls that is provided thereby have been discontinued, eliminating any potential bypass flow parallel to the flow through the choking device on the part of the flow through the valve.

When the supplementary-valve controls are in the self-maintenance phase, any leakage flows that may occur at the self-maintaining members are diverted, without being choked off, through the supplementary valve, which is open at that time, in the flow connection between the self-maintaining members and the outlet. This ensures reliable self-maintenance. Once self-maintenance has been released, the resulting relative motion of the supplementary-valve controls will close the supplementary valve. It is now completely impossible for the flow through the valve to bypass in any way and it will be conducted entirely though the choking device. An absolutely reliable valve-piston closure stroke will be attained even when the flowthrough is very slight.

In one particularly simple embodiment of an self closing valve in accordance with the invention, the supplementary-valve controls consist partly of a control tappet that is positioned axially centered inside the valve piston, that supports both a sealing plate, which operates in conjunction with the bottom surface of the valve piston and ensures self-maintenance, and a choking collar, which operates as a device that chokes off the flow through the valve, at its own bottom end and that has perforations available that, in the self-maintenance phase, connect the chamber left between the valve piston, the sealing plate, and the control tappet to the outlet through the bore inside the control tappet.

This embodiment is characterized in that a surrounding flange that operates in conjunction with the seat of the valve piston is positioned on the control tappet below its relatively large perforations in such a way that these structures constitute the supplementary valve.

An embodiment of the invention will now be described with reference to the attached drawing, wherein:

DETAILED DESCRIPTION OF THE PREFERRED EMBODIMENTS

Figure 1:
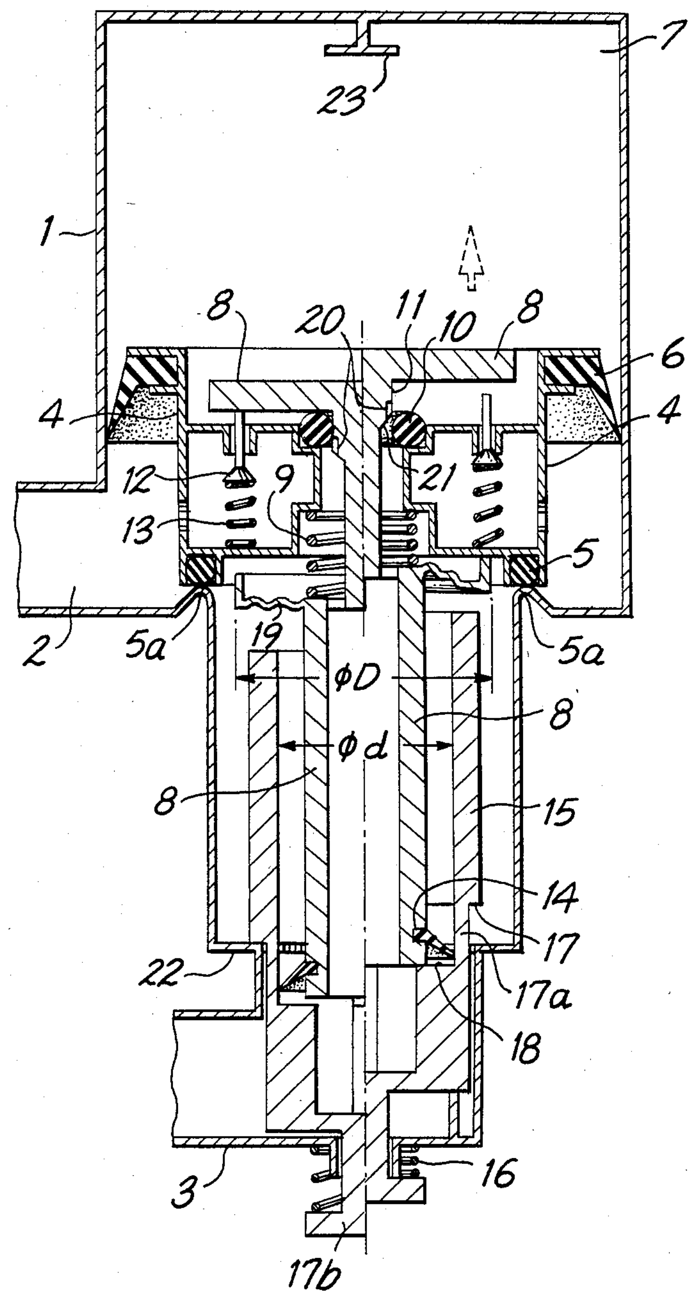
FIGS. 1–3 show sections of a valve according to the prior art
Figure 2:
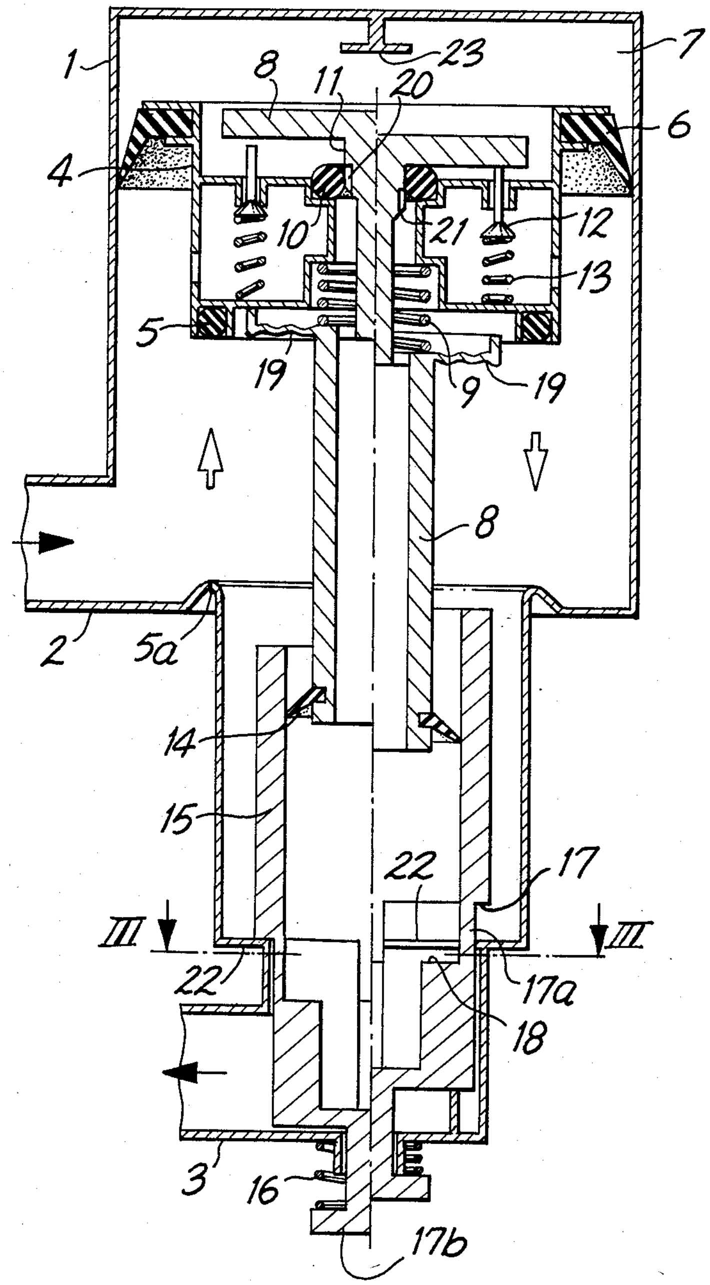
Figure 3:
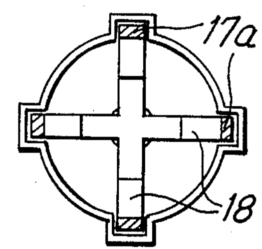

Referring now to FIGS. 1–3, a prior art self-closing valve includes a housing 1 having a water inlet 2 and a water outlet 3. Inside the top of housing 1 is a valve piston 4 that operates in conjunction with a valve seat **5*a* at the side of the housing between inlet 2 and outlet 3. Valve piston 4 also has a collar seal 6 that seals off a discharge chamber 7 above valve piston 4**.

In the middle of valve piston 4 is a control tappet 8 that can be moved axially in relation to the piston and that operates at the top in conjunction with an O ring 10 mounted on the piston and with a shoulder 11 to constitute a valve that activates the self closing valve in the sense that, when the value is in the closure state, tappet 8 is held down by a compression spring 9 and seals off discharge chamber 7 from water outlet 3. In said closure state, a flange at the top of control tappet 8 holds a valve tappet 12 open against the force of compression spring 13 in such a way that, as will be evident from the left-hand side of FIG. 1, discharge chamber 7 communicates with water inlet 2.

At the bottom end of control tappet 8 is a constriction collar 14 that is positioned in such a way that the outer edge of its lip can move up and down in a bore with a diameter d in a control bushing 15.

At the end of the upper cylindrical section of control bushing 15 is a connection 17, from which the bushing extends downward in the form of four webs 17*a* arranged in the form of a cross, positioned in corresponding recesses in the side of housing 1 as shown in FIG. 3, and demarcating window-like perforations that the water can flow to water outlet 3 through when the valve is in the operating state. At the bottom of control bushing 15, webs 17*a* unite to create a floor plate, from which a pushbutton 17*b* extends out of housing 1. Pushbutton 17*b* is subject to a compression spring 16 that is mounted on housing 1 at the other end and normally holds the connection 17 in control bushing 15 against a contoured seat in the side of the housing.

Webs 17*a* have elevations 18 inside them that can act on the bottom of control tappet 8. Choking collar 14 slides along an initial path originating in the stroke of control tappet 8, first along webs 17*a* and then up to the contoured edge 22 of the contoured seat in the side of housing 1.

Control tappet 8 has an axially flexible disk seal 19 that demarcates an outside diameter D below valve piston 4 but above control bushing 15. Control tappet 8 also has a small groove 20 in the vicinity of a constriction 21 that extends inward from a shoulder 11.

The function of the self-closing valve will now be described with reference to the partial section illustrated on the left side of FIG. 1, which represents the valve in the closed state. The seal 5 of valve piston 4 rests on the valve seat 5*a* in the side of housing 1 and seals it off, separating water inlet 2 from water outlet 3. The sealing force derives from the static pressure of the medium flowing through. Valve tappet 12 is in the open state, with water inlet 2 communicating with discharge chamber 7. In this state, compression spring 9 also holds control tappet 8 down, keeping the activating valve constituted by O ring 10 and shoulder 11 closed. Choking collar 14 is simultaneously in a position definitely below the contoured edge 22 of housing 1, and the connection 17 in control bushing 15 is resting against edge 22.

When pushbutton 17*b* is activated against the force of compression spring 16, control bushing 15 is forced up and in turn forces control tappet 8 up by means of elevations 18 in such a way that axially flexible disk seal 19 is forced against the bottom of valve piston 4. The shoulder 11 in control tappet 8 moves in relation to O ring 10 in such a way that small groove 20, acting like a nozzle, allows water to escape from discharge chamber 7. Since groove 20 is very small and must accordingly be subject to hydraulic self-maintenance during the slow opening motion of the valve that will be described hereinafter, whereas the pressure is accordingly released too slowly to initiate an upward motion on the part of valve piston 4, the axial flexibility of disk seal 19 will allow control tappet 8 to be lifted even higher, to the extent, specifically, that constriction 21 opens a more extensive flow-through cross-section for the water coming from discharge chamber 7, as will be evident from the partial section on the right side of FIG. 1.

Since the amount of water escaping from discharge chamber 7 with control tappet 8 in this position cannot be augmented because compression spring 13 is keeping valve tappet 12 closed (right side of FIG. 1), the pressure against the bottom of valve piston 4 and deriving from water inlet 2 will lift valve piston 4 from its seat, so that the diameter of the piston will be longer at the top than at the level of the seat.

At this stage of the lifting of valve piston 4 (the partial section on the right in FIG. 1 shows the valve just before the piston is lifted), however, since choking collar 14 is still below contoured edge 22, water cannot pass from water inlet 2 to water outlet 3 unconstricted and unimpeded even though the connection 17 in control bushing 15 has been lifted off of contoured edge 22. The water can only pass along choking collar 14 due to an appropriate deformation of its outer edge. A pressure gradient is accordingly established between water inlet 2 and water outlet 3 and is transmitted upward to disk seal 19 and downward to choking collar 14. The difference between diameters D (the outside diameter of disk seal 19) and d (the inside diameter of control bushing 15) leads in conjunction with the difference in pressure between the top and bottom of disk seal 19 to control tappet 8 being forced upward by its disk seal 19 against the force of compression spring 9.

Although the choking action of choking collar 14 is powerful enough to keep control tappet 8 lifted against the force of compression spring 9 while still tightly in its completely lifted position as illustrated, although only partly lifted, on the right side of FIG. 1, discharge chamber 7 does not subsequent to the initial opening phase just described remain downwardly free to the same extent, but can only be emptied through small nozzle-like groove 20. This delays the upward opening motion of valve piston 4. Since pushbutton 17*b* has in the meantime been released and been forced back again by compression spring 16, so that the connection 17 in control bushing 15 now rests against the contoured edge 22 on the side of housing 1 again as represented on the left side of FIG. 2, water can now travel to water outlet 3 only along choking collar 14 and the aforesaid pressure gradient or pressure difference generated by constriction collar 14 will be maintained as the piston continues to move slowly upward as will be evident from the left-hand side of FIG. 2. The result is hydraulic self-maintenance. The slow opening motion of valve piston 4 actually constitutes a timing device for the valve.

The smaller nozzle-like groove 20 is and the longer the available opening stroke of the piston, the longer the valve takes to operate.

The opening stroke of valve piston 4 can be limited by means of an adjustable stop 23 at the top of discharge chamber 7. When the valve is operating normally and the flange on control tappet 8 encounters stop 23, control tappet 8 is forced down in relation to valve piston 4, whereupon disk seal 19 will lift off of the bottom surface of valve piston 4. This, however, cancels out the self-maintaining difference between the pressures on the two surfaces of disk seal 19. Control tappet 8 accordingly shifts completely back into its lower position. This also forces valve tappet 12 into its open position against the force of compression spring 13, opening up a passage with a relatively large flow-through cross-section between water inlet 2 and discharge chamber 7, which fills up rapidly, so that the valve closes relatively rapidly in relation to a relatively rapid downward motion of valve piston 4. Mechanisms that are in themselves known and accordingly not illustrated simultaneously ensure that the closure motion is sufficiently damped just before completion to prevent slugs in the supply line.

The operating state just described is illustrated at the top of the partial section on the right side of FIG. 2.

It is, however, also possible to interrupt the prescribed operating time of the valve and shift valve piston 4 over to a rapid and premature backward motion to close the valve during the initially described slow opening motion. All that is necessary is to reactivate pushbutton 17*b* during the slow opening motion of valve piston 4 as illustrated on the left side of FIG. 2, which simultaneously starts the fixture running. When this occurs, once choking collar 14 has traveled up over the contoured edge 22 on the side of the housing, a bypass flow that bridges over choking collar 14 is generated through the annular channel between housing 1 and the outer jacket of control bushing 15 and through the now open windows between webs 17*a* to the extent that these windows are positioned between connection 17 with control bushing 15 forced in by pushbutton 17*b* on the one hand and contoured edge 22 on the other. The situation will be evident from the bottom of the partial section on the right side of FIG. 2. Disengaging the action of choking collar 14 also leads to a breakdown of the pressure difference on the two surfaces of disk seal 19 that produces the self maintenance, so that control tappet 8 travels down prematurely and valve piston 4 moves back in a rapid closure motion as previously described herein.

It should be remarked that premature interruption of the prescribed operating time can occur only when choking collar 14 has traveled beyond contoured edge 22 while valve piston 4 is carrying out its opening stroke because there is now way for an effective bypass flow to become established otherwise. The situation is arrived at a few moments after initial activation of the valve. This also prevents the valve from, say, immediately turning off after each initial activation.

Figure 4:
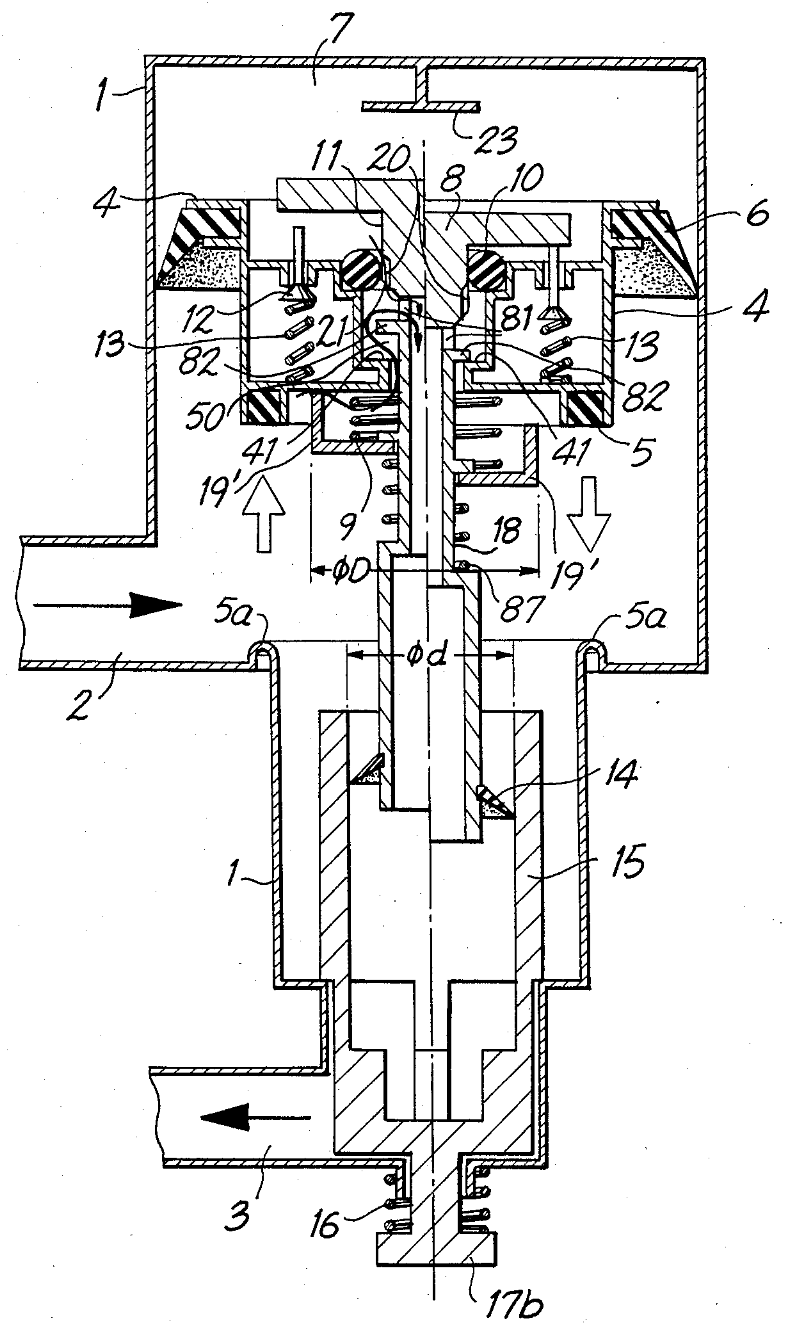
FIG. 4 shows two schematic partial sections of the valve in accordance with the invention.

In accordance with the improvement of the present invention, FIG. 4 shows the valve of the present invention wherein the same numerals represent the same elements shown in FIGS. 1–3.

Below valve piston 4 control tappet 8 supports a sealing plate 19' that defines an outside diameter D. Sealing plate 19' is axially flexible in relation to the control tapet 8 because, in the embodiment illustrated, it is positioned with a certain amount of play at a section 18 of control tappet 8 that has a smaller diameter, where the plate is subjected to a compression spring 87 that is more resilient than the compression spring 9 that forces the tappet against valve piston 4.

The narrow upper section, the shaft, of control tappet 8 is connected to the lower, hollow, section, which constitutes a flow cross-section that is open toward water outlet 3, by means of webs with perforations 81 between them.

A supplementary valve 50 is accordingly left between valve piston 4 and control tappet 8, in addition to which a surrounding flange 82 is positioned in the embodiment illustrated on control tappet 8 immediately below the perforations 81 leading to its inside flow cross-section and hence below groove 20. Flange 82 contributes, with a seat 41 shaped into the perforation in valve piston 4 for control tappet 8, to the formation of supplementary valve 50.

The opening and closing positions of supplementary valve 50 derive from the particular positions of valve piston 4 and control tappet 8 in relation to each other.

When the self closing valve is activated by means of push-button 17*b*, control bushing 15 is forced up and forces control tappet 8 up in turn, forcing sealing plate 19' against the bottom surface of valve piston 4. The simultaneous displacement of the shoulder 11 of control tappet 8 out of sealing ring 10 releases small groove 20, allowing water to flow in the direction indicated by the upper curly arrow. Valve piston 4 rises with a decelerated opening stroke that is determined by the cross-section of the groove because the closing position of valve tappet 12 that also results therefrom counteracts an increase in the water in discharge chamber 7.

The water from water inlet 2 cannot, however, arrive in outlet 3 unchoked or unimpeded, but must flow by choking collar 14. The resulting pressure is also transmitted to sealing plate 19'. As a result of the difference in the two diameters, the outside diameter D of sealing plate 19' and the inside diameter d of control bushing 15, plus the difference between the pressures at the top and at the bottom of sealing plate 19', control tappet 8 is forced up by sealing plate 19' against the force of compression spring 9.

In this phase of hydraulic self-maintenance, the supplementary valve 50 consisting of surrounding flange 82 and seat 41 is open. Any leakage flows between sealing plate 19' and the bottom of valve piston 4 and any leakage flow between the spring-loaded support for sealing plate 19' can accordingly flow through at control tappet 8 in the direction indicated by the lower curly arrow into the unchoked open flow cross-section inside control tappet 8 to water outlet 3.

Upon termination of a normal flushing process as predetermined by small groove 20 in the capacity of a timer, control tappet 8 impacts against stop 23, forcing it down in relation to valve piston 4 and forcing sealing plate 19' away from the bottom of valve piston 4. The self-maintaining pressure difference is accordingly eliminated and control tappet 8 shifts completely back into its lower position. Since this also forces valve tappet 12 into its open position, a relatively wide flowthrough cross-section is left open between water inlet 2 and discharge chamber 7. The valve closes with a relatively rapid downward stroke of valve piston 4. The closure process is relatively similar when a repeated activation of push-button 17*b* discontinues self-maintenance prematurely and the valve is prematurely shifted over to the closing stroke.

Supplementary valve 50 is closed when control tappet 8 moves down in relation to valve piston 4 because surrounding flange 82 will then rest on seat 41. This, however, blocks off the bypass inside control tappet 8 through the flow cross-section to water outlet 3 and the overall flow through the valve must occur through choking collar 14, so that, even when the flow is very slight, the tensional effect of choking collar 14 that is essential for closing is ensured.

It will be appreciated that the instant specification and claims are set forth by way of illustration and not limitations, and that various modifications and changes may be made without departing from the spirit and scope of the present invention.

What is claimed is:

1. In a self closing valve having a housing including a water inlet and outlet and a valve piston mounted in the housing with one end of the piston facing away from a valve seat forming a discharge chamber in conjunction with the housing which communicates with the inlet and outlet through flowthrough passages, supplementary-valve control means for controlling the flow through the passages by effecting a decelerated opening stroke of the valve piston and a rapid closing stroke of the valve piston and including means for hydraulically maintaining an initiating position of the supplementary-valve control means during opening of the valve piston and shifting the supplementary-valve control means upon discontinuance of the maintenance including a choking device, the improvement comprising supplementary-valve means for any leakage flows that directly occur at the hydraulically maintaining means to the outlet without being choked off, wherein the supplementary-valve means is opened in response to the initiating position of the supplementary-valve control means and is closed in response to a shift in the supplementary-valve control means when maintenance is discontinued, thereby eliminating any bypass flow parallel to flow through the choking device.

2. The valve as in claim 1, wherein the supplementary-valve control means comprises a control tappet positioned axially centered inside the valve piston, a sealing plate supported on a bottom end of the control tappet which operates in conjunction with a bottom surface of the valve piston to ensure said maintenance, a choking collar supported on the bottom end of the control tappet choking off the flow through the valve, above in the control tappet, perforations in the control tappet for connecting a chamber between the valve piston, the sealing plate, and the control tappet to the outlet through the bore inside the control tappet, and wherein the supplementary-valve means comprising a flange on the control tappet below the perforations and coactive with the seat of the valve piston.

* * * * *